(12) United States Patent
Kruhsel et al.

(10) Patent No.: US 8,132,589 B2
(45) Date of Patent: Mar. 13, 2012

(54) REGULATING VALVE FOR THE DISCHARGE OF LIQUID

(75) Inventors: Bernhard Kruhsel, Harpstedt (DE); Gunter Herbold, Bremen (DE)

(73) Assignee: Gestra AG, Bremen (DE)

( * ) Notice: Subject to any disclaimer, the term of this patent is extended or adjusted under 35 U.S.C. 154(b) by 689 days.

(21) Appl. No.: 12/297,909

(22) PCT Filed: Apr. 11, 2007

(86) PCT No.: PCT/EP2007/053492
§ 371 (c)(1),
(2), (4) Date: Oct. 21, 2008

(87) PCT Pub. No.: WO2007/131842
PCT Pub. Date: Nov. 22, 2007

(65) Prior Publication Data
US 2009/0152482 A1    Jun. 18, 2009

(30) Foreign Application Priority Data
May 15, 2006    (DE) .......................... 10 2006 022 931

(51) Int. Cl.
*F16T 1/20* (2006.01)

(52) U.S. Cl. ........ 137/195; 137/196; 137/412; 137/434; 251/28; 251/33; 251/45

(58) Field of Classification Search .................. 137/171, 137/177, 183, 187, 192, 195, 196, 395–398, 137/409, 411, 412, 434; 251/25, 28, 33, 251/45
See application file for complete search history.

(56) References Cited

U.S. PATENT DOCUMENTS

| | | | |
|---|---|---|---|
| 673,250 A * | 4/1901 | Ford | 137/195 |
| 3,054,419 A | 9/1962 | Farrell | |
| 3,896,838 A * | 7/1975 | Foller | 137/195 |
| 3,906,985 A * | 9/1975 | Foller | 137/192 |
| 4,004,604 A * | 1/1977 | Deinlein-Kalb | 137/183 |
| 4,030,516 A * | 6/1977 | Foller | 137/192 |
| 4,082,106 A | 4/1978 | Butcher | |

FOREIGN PATENT DOCUMENTS

| | | |
|---|---|---|
| DE | 2351716 B1 | 1/1975 |
| DE | 2649053 A1 | 5/1978 |
| DE | 220101 A1 | 3/1985 |
| DE | 4036581 A1 | 8/1991 |
| DE | 29903211 U1 | 7/1999 |
| DE | 69525070 T2 | 9/2002 |
| FR | 2299582 | 8/1976 |
| GB | 2333167 A | 7/1999 |
| JP | 6011791 A | 1/1985 |

* cited by examiner

*Primary Examiner* — Craig Schneider
(74) *Attorney, Agent, or Firm* — Wood, Herron & Evans, L.L.P.

(57) ABSTRACT

The invention concerns a regulating valve for the discharge of liquid from a container comprising a movable main valve body for opening and closing an outlet opening for the liquid to be discharged, and a movable pilot valve body for controlling the main valve body, characterized in that the main valve body and the pilot valve body are mechanically coupled together at least in one position relative to each other.

23 Claims, 9 Drawing Sheets

REGULATING VALVE FOR THE DISCHARGE OF LIQUID

The invention concerns a regulating valve for the discharge of liquid from a container comprising a movable main valve body for opening and closing an outlet opening for the liquid to be discharged, and a movable pilot valve body for controlling the main valve body. The invention further concerns a container having a regulating valve arranged thereon.

Such regulating valves for the discharge of liquid from a container are generally known. They are used for example for the discharge of condensate from gas lines. For that purpose a container is connected to a gas line so that any condensate is collected in the container. In addition, arranged in the container is a valve for the discharge of the condensate through an outlet opening. At the same time, prevailing in the container is an increased pressure which is also referred to as the primary pressure and which is suitable for holding the valve in its closed position. For that purpose the differential pressure between the primary pressure and the pressure outside the container on a surface corresponding to the cross-section of the outlet opening acts on the main valve body, whereby the outlet opening is closed.

When the condensate in the container rises a float is lifted which is mechanically coupled to a pilot valve body and which thereby opens the pilot valve. The pilot valve is connected by way of a line to a chamber in the main valve body so that opening of the pilot valve at the same time results in opening of the chamber in the main valve body. Accordingly, the pressure in the chamber (chamber pressure) in the main valve body can be reduced by opening of the pilot valve. Depending on the respective open position of the pilot valve the pressure in the chamber falls so greatly that a force in the opening direction results at the main valve body, from the pressure difference between the primary pressure and the chamber pressure, and that leads to opening of the outlet opening by the main valve body so that the condensate can flow away.

The fact that the condensate flows out of the container means that the float drops again and closes the pilot valve. As a result the pressure in the chamber of the main valve body rises again, the closing force then predominates over the opening force and the main valve body closes the outlet opening again.

The regulating valve in accordance with the state of the art therefore opens the main valve when a given amount of condensate is exceeded and closes the main valve when the amount of condensate falls below the given amount.

Accordingly, it is precisely when large amounts of condensate are to be discharged that the main valve opens when a given level of condensate is exceeded, and then a part of the condensate flows away from the container, whereupon the level of condensate in the container falls below the level for closure again and the main valve closes again. When high pressures are involved in the container, vigorous closure processes occur by virtue of the pressure-controlled opening and in particular closing. In that respect, a continuous opening and closing procedure can occur precisely when dealing with large amounts of condensate to be discharged. Such a continuous opening and closing movement when vigorous switching operations are involved can be noise-intensive and represents a mechanical loading at any event on the valve arrangement. Added to that is the fact that the arrangement on in particular metal gas pipes or the like results in good but unwanted distribution of those switching noises.

Accordingly the object of the present invention is to at least reduce the described disadvantages and in particular to provide a regulating valve which avoids continuous opening and closing of the main valve body.

In accordance with the invention therefore, for a regulating valve as set forth herein, it is proposed that the main valve body and the pilot valve body are mechanically coupled together at least in one position relative to each other.

The invention is based on the notion of supplementing in specifically targeted fashion pressure-controlled switching of the valve by a direct mechanical coupling between the pilot valve body and the main valve body. It is precisely when dealing with high primary pressures which can amount to several bars that the pressure forces are so great that a mechanical force due to a float body usually has no or almost no influence on opening or closing. In the closed rest condition of the main valve body the force acting in the closing direction from a differential pressure predominates whereas in the opened condition the force acting in the opening direction from a differential pressure predominates on the main valve body. If however the main valve body changes over from closing to opening or vice-versa, the above-mentioned forces are approximately compensated. Here, in accordance with the invention, mechanical coupling which otherwise can exert only low forces in relation to the pressure-induced forces can intervene in the control of the main valve body.

Such a coupling does not need to exist in every position of the pilot valve body relative to the main valve body. Rather for example the pilot valve body can firstly move freely with respect to the main valve body in order then to come into engagement with the main valve body. In that case the mechanical coupling can also be limited only to one direction of movement.

In one configuration the movement of the pilot valve body and also the main valve body takes place along a common axis, in which case the coupling also involves that movement. In that respect the coupling can be limited for example to a forward direction or a rearward direction.

Preferably the mechanical coupling is effected by way of a bodily contact between the pilot valve body and the main valve body. Such a bodily contact can occur directly or indirectly between those two bodies. The two bodies are therefore in contact with each other directly or by way of at least one further component.

In accordance with an embodiment there is provided an entrainment means for transmitting a movement of the pilot valve body to the main valve body or vice-versa. For that purpose for example the pilot valve body may have a projection facing towards the main valve body and the main valve body may have a projection facing towards the pilot valve body. When the pilot valve body moves with its projection towards that of the main valve body, bodily contact occurs and thus coupling is implemented between the two valve bodies. When the described movement of the pilot valve body is continued then the main valve body is entrained by way of the contact between those two projections and the movement of the pilot valve body is thus transmitted to the main valve body if the further boundary conditions permit such a movement of the main valve body.

In a further configuration for coupling the main valve body to the pilot valve body there is provided an elastic coupling means, in particular a spring. Such an elastic coupling means can produce a biasing action between the main valve body and the pilot valve body. Such an elastic coupling means provides that a force can be transmitted between the two valve bodies without a movement having to be directly transmitted. Thus, with at the same time a freedom for movement of the two valve bodies relative to each other, a coupling exists between them.

It is desirable if the entrainment means is adapted to transmit a force of the pilot valve body to the main valve body in the opening direction of the main valve body and/or the elastic coupling means is adapted to transmit a force of the pilot valve body to the main valve body in the closing direction of the main valve body. In that arrangement the pilot valve body can firstly be moved out of its closed position in order thereby to control a pressure. When the movement continues the pilot valve body, by means of the entrainment means, then comes into contact with the main valve body to transmit a force to the main valve body in its opening direction. When the movement of the pilot valve body continues the main valve body then also moves, by virtue of the coupling.

Accordingly in the closing direction the pilot valve body can exert a force on the main valve body in the closing direction by way of the elastic coupling means without the existence of a direct coupling of the movement of the two valve bodies. At the same time in that case the elastic coupling means acts in opposite relationship to the movement of the pilot valve body in the closing direction.

If the main valve body is arranged vertically and the closing direction points downwardly, the force of gravity exerts a force on the main valve body in the closing direction. Depending on the respective design configuration involved that can mean that the elastic coupling element becomes redundant.

Preferably the main valve body is coupled to a float mechanically, in particular by way of a lever arrangement and/or by way of the pilot valve body. In that case a lever arrangement can act directly on the main valve body and on the float and thereby implement the coupling or however the pilot valve body is connected to the float by way of a lever arrangement and coupling is effected from the float to the main valve body by way of the pilot valve body. In that case, the elastic coupling means and/or the entrainment means can also be used for coupling the main valve body to the float.

It is desirable if the float is so connected to the main valve body that any buoyancy force at the float acts on the main valve body in the opening direction of the main valve body. Accordingly an upward floating movement of the float would lead to the outlet opening being opened if the further forces acting on the main valve body permit such a movement. Depending on the further forces acting on the main valve body and depending on the float position, the main valve body can also assume intermediate positions between completely closed and completely open.

In addition, in accordance with the invention there is provided a regulating valve which has a bellows for surrounding a chamber in the main valve body and wherein the main valve body has a control opening closable by the pilot valve body. In that case a chamber is enclosed by a bellows to provide that the chamber is closed off. In that case the bellows provides for stability in the radial direction with at the same time mobility in the axial direction. Preferably such a bellows is made from a metal, in particular noble metal. The control opening in the main valve body is closable by the pilot valve body and thus a movement of the pilot valve body for opening or closing the control opening is at the same time a movement relative to the main valve body.

Preferably a closing and opening direction of the pilot valve with respect to the control opening is also the closing and opening direction respectively of the main valve body with respect to the outlet opening.

In an advantageous configuration the bellows substantially surrounds the main valve body in the form of a cylindrical casing. It is further advantageous if the bellows forms a wall of the chamber, in particular for closing off the chamber relative to the container. In that case the bellows is primarily provided as the cylindrical casing of the chamber. In that arrangement the chamber is closed off in the radial direction by a bellows. For further closure purposes it is possible to provide two end portions, between which the bellows forms a connection. In that case the two end portions can be moved relative to each other by way of the axially elastic bellows in order in that case to maintain a substantially closed chamber.

Preferably in that case not just such a chamber is provided as a part of the main valve body, but that chamber comprising the bellows and the delimiting end portions substantially forms the main valve body. Therefore, to open and close the outlet opening, one of the end portions which has a closing surface for closing the outlet opening is moved relative to the outlet opening. In the case of such a movement either the end portion with the outlet opening can be moved relative to the other end portion of the main valve body by the bellows being extended or stretched, or the entire main valve body including both end portions and bellows is moved with respect to the outlet opening. A combined movement can also be correspondingly considered.

In accordance with a preferred embodiment the control opening closable by the pilot valve body is connected to the chamber so that the chamber can be opened by the pilot valve body to permit a reduction in pressure in the chamber. Accordingly an opening movement of the pilot valve body leads to opening of the control opening. In that way at the same time the chamber is opened so that pressure in the chamber can decrease depending on the respective degree of opening of the control opening. That influences the pressure and force conditions which act on the main valve body and cause opening or closing of the outlet opening by the main valve body. Accordingly the pressure in the chamber can be controlled by the control opening in the main valve body, and therewith the differential pressures between the chamber pressure and the primary pressure and between the chamber pressure and the external pressure prevailing outside the container, and thus opening and closing of the outlet opening by the main valve body.

Preferably in that respect the regulating valve is characterised in that the main valve body has a chamber end face facing towards the chamber to convert a first differential pressure between the pressure in the chamber and an external pressure into a force in the closing direction of the main valve body and an opening face which is remote in relation to the chamber end face to convert a second differential pressure between the pressure in the container and the pressure in the chamber into a force in the opening direction of the main valve body. In that case the external pressure denotes the pressure in the outlet opening and a connected discharge line system, in which respect the external pressure can often be assumed to be atmospheric pressure. In this case the first differential pressure in the chamber acts on the chamber end face substantially corresponding to the cross-sectional area of the outlet opening. The cross-sectional area of the outlet opening is referred to as the outlet area. The second differential pressure basically acts at the side remote from the chamber end face in a direction towards the chamber and thus in a direction towards the bellows to upset same. The face on which the second differential pressure acts in the opening direction is referred to as the opening face. The opening face substantially corresponds to the cross-sectional area of the bellows less the outlet area.

In a still further advantageous configuration the regulating valve is characterised in that a force acting on the main valve body is substantially determined by a force difference between the product of the chamber end face and the first differential pressure acting thereon and the product of the opening face and the second differential pressure acting thereon. The first differential pressure acts on the chamber end face in the closing direction and the second differential pressure acts on the opening face in the opening direction. If both differential pressures are equal in magnitude for example in the steady-state condition but the chamber end face is larger than the opening face, that results in a force in the closing direction. On the assumption that the chamber end face, the opening face, the primary pressure and the external pressure are constant, the force difference can be influenced only by a change in the chamber pressure. To produce a force in the opening direction therefore the chamber pressure has to be reduced until the product of the first differential pressure and the chamber end face becomes less than the product of the second differential pressure and the opening face. For that purpose the pressure in the chamber is reduced by opening of the control opening by the pilot valve body. Accordingly the main valve body is controllable by way of the relationship of the two specified products.

Preferably the pilot valve body is at least partially arranged within the main valve body.

An advantageous configuration of the regulating valve is one in which the pilot valve body and the main valve body are arranged coaxially relative to each other and/or at least one of the two valve bodies is movable along the longitudinal axis thereof. Preferably in that case the main valve body is substantially of a sleeve form. Accordingly the main valve body can be provided in the form of a sleeve, within which the pilot valve body, in the form of an approximately cylindrical piston, is movable axially along its axis and at the same time the axis of the main valve body. The control opening in that case can be provided centrally in the chamber end face of the main valve body. In that case the pilot valve body and the main valve body can be constructed substantially except for the bellows from turned components and guidance of the pilot valve body within the main valve body thereby equally saves on space.

In a further preferred feature the main valve body at one end has a substantially conical or spherical narrowing for closing the outlet opening. That makes it possible to achieve an advantageous closure effect with a configuration which is equally simple in terms of design structure.

Desirably the control opening is arranged in the conical or spherical narrowing. Accordingly the outlet opening can be closed in relation to the container by that conical or spherical narrowing and at the same time the control opening can project into the outlet opening so that pressure from the chamber, with the outlet opening basically closed, can nonetheless be reduced by way of the outlet opening.

Preferably the bellows is connected at one side to a cover to close the chamber or it is provided with a cover. That provides in a simple fashion for closing the chamber, in which respect the cover optionally forms a constituent part of the bellows.

In that connection, in accordance with a configuration, the cover is arranged movably with respect to the outlet opening and/or the opening face. Such mobility is in particular in the axial direction towards or away from the outlet opening. In that respect the movement can be effected together with or separately from the opening face. If the movement occurs separately or partly separately from the opening face, that signifies that the bellows is stretched or upset in the movement.

In an advantageous configuration the main valve body has an abutment. The movement thereof is limited in particular in the axial direction in that way. Such an abutment can be provided for example at the cover of the bellows, whereby in that case the abutment is connected to an end of the bellows.

The opening face can move in that case relative to the cover. If a certain degree of upsetting of the bellows is achieved in that case, the movement then reaches the abutment so that no further upsetting of the bellows occurs.

A guide can be provided for movement of the cover with respect to the outlet opening, such as for example a guide cylinder embracing the bellows.

In accordance with an advantageous configuration the regulating valve is characterised in that pilot valve body projects into the chamber through a through opening arranged in particular in the cover and the through opening permits axial movement of the pilot valve body. The pilot valve body is arranged in that case in the main valve body and at the same time projects through the through opening outwardly where it can be coupled to a float. Therefore the pilot valve body can be moved in the main valve body and in this case in the chamber to open or close the control opening. Provided outside the main valve body is a coupling for example with a float. In that case the pilot valve body is moved from the exterior by the float to entirely or partially open or close the control opening in the main valve body.

It is desirable if, for at least steady-state pressure equalisation between the chamber and the container, there is provided an equalisation opening, and in particular the equalisation opening is identical to the through opening. Such an equalisation opening provides that, in the steady-state and closed condition of the main valve body, the chamber is of substantially the same pressure as the container. The chamber pressure should therefore then correspond to the primary pressure. In that respect the equalisation opening must be kept so small that, in the case of the control valve opening, the equalisation opening does not completely prevent a reduction in pressure in the chamber through the control opening. There is no need to guarantee a drop in pressure in the chamber completely to the value of the external pressure, that is to say the pressure which prevails in the region of the outlet opening. It is only necessary to ensure a sufficient pressure drop in the chamber. By way of example, with respect to atmospheric pressure with an external pressure of 0 bar, in the region of the outlet opening, and with a primary pressure of 4 bars in the container, the chamber pressure when the control opening is opened could drop to 2 bars, in which case the main valve body then opens.

Such an equalisation opening can thus be readily achieved if it is identical to the through opening, in which case the desired effect is first afforded together with a pilot valve body which is passed through the through opening. The equalisation opening then forms a small annular gap around the pilot valve body in the region of the through opening.

A conical or spherical configuration which is thus to be provided at the end of the pilot valve body is also advantageous for closing the control opening.

Preferably the regulating valve according to the invention is arranged in a container and is especially matched thereto.

An embodiment is described in detail hereinafter with reference to the accompanying drawings in which.

Figure 1:
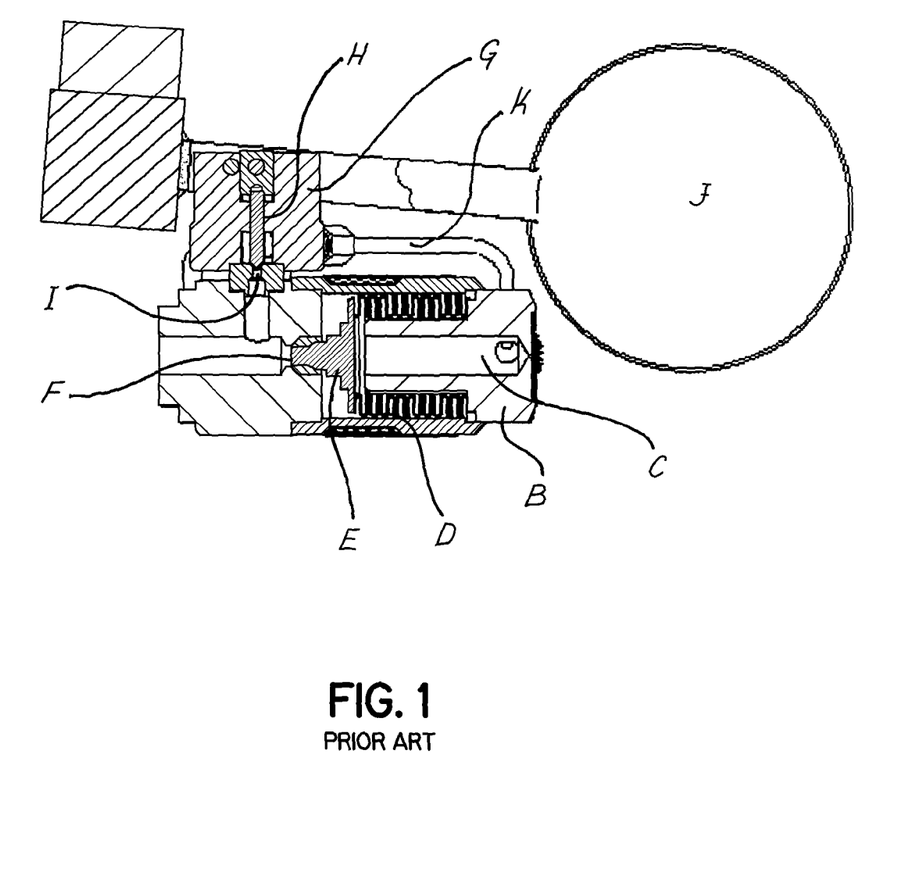
FIG. 1 shows a view in section of a valve arrangement in accordance with the state of the art.

A known regulating valve as shown in FIG. 1 has a main valve body B with a chamber C, a bellows D and a closing portion E. The closing portion E is provided for closing an outlet opening F. Control of the main valve body B is effected by way of the pilot valve G having a pilot valve body H and a control opening I. When the float J rises the pilot valve body H opens the control opening I and a pressure drop occurs in the pilot valve G and is transmitted to the chamber C by way of the connecting line K. Therefore the pressure in the chamber C then also falls and the differential pressure acting from the left on the closing portion E in the drawing, as between the container and the chamber, multiplied by the engagement area, predominates over the differential pressure between the chamber C and the outlet opening F multiplied by the cross-sectional area of the outlet opening F. Consequently the main valve body B moves out of the outlet opening F to open it to discharge condensate or another liquid.

When the float J falls again the control opening is closed and the pressure in the control valve G and thus also in the chamber C rises again. Consequently the force resulting from the pressures and acting in the closing direction predominates and the outlet opening is closed.

The pilot valve and the main valve in this known regulating valve are locally separated from each other and there is no direct mechanical coupling, either between the pilot valve body H and the main valve body B or between the float J and the main valve body K.

Figure 2:
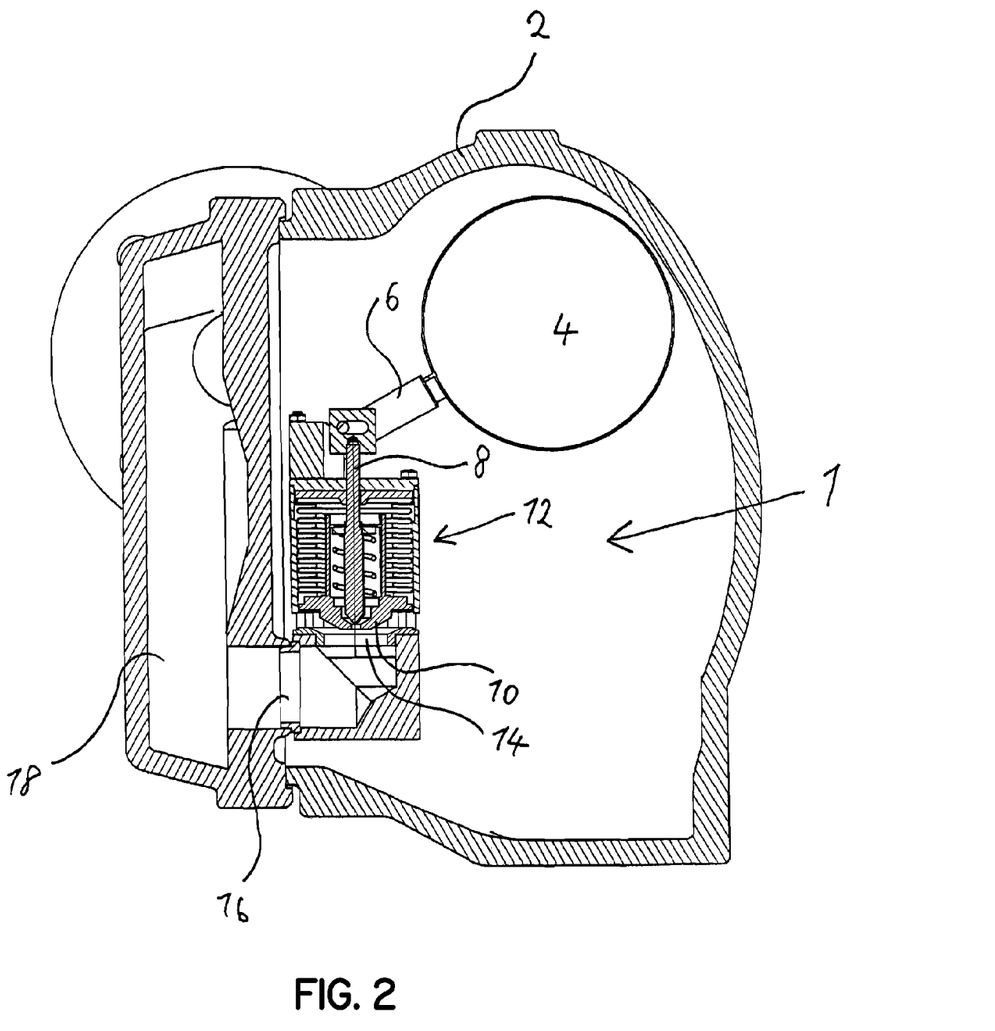
FIG. 2 shows a view in section of a valve arrangement according to the invention with float in a container with an outlet opening completely open.

Referring to FIG. 2 a regulating valve 1 according to the invention is arranged in a container 2 together with a float 4 which is in its upper end position. Liquid such as for example condensate can collect in the container 2 which is often also referred to as a cap. A rising level of liquid means that a force is applied to the float 4 in a direction facing upwardly in the Figure. The float 4 transmits such a force by way of the arm 6 to the pilot valve body 8 in order finally to initiate an opening movement for the closing portion 10 of the main valve body 12. With such an opening movement the closing portion 10 opens the outlet opening 14. That opening mechanism is described in detail hereinafter.

When the outlet opening is open the liquid can then be discharged from the container 2 past the closing portion 10 through the outlet opening 14 by way of a connecting device 16 and finally a discharge line system 18 from the container 2.

If the level of liquid drops due to the discharge of liquid from the container 2 the float 4 also moves downwardly and the closing portion 10 can finally close the outlet opening 14.

Figure 3:
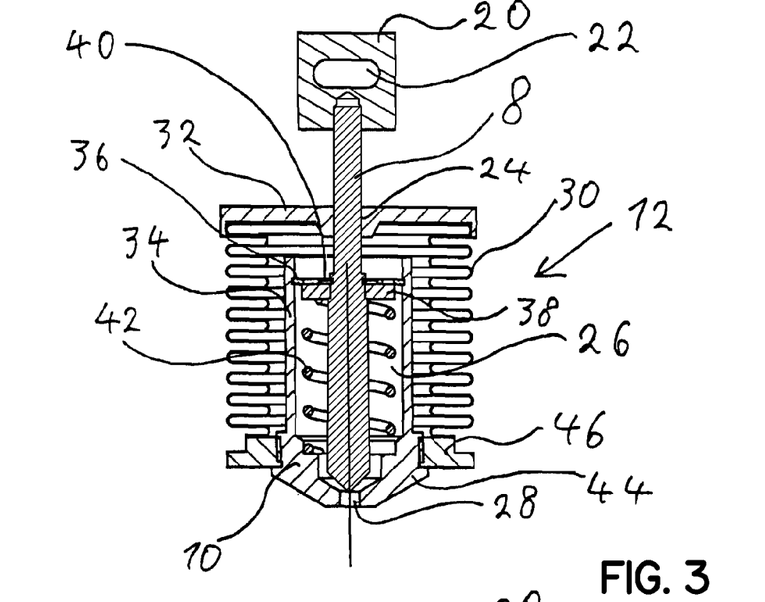
FIG. 3 shows a view in section of a main valve body with included pilot valve body.
Figure 4:
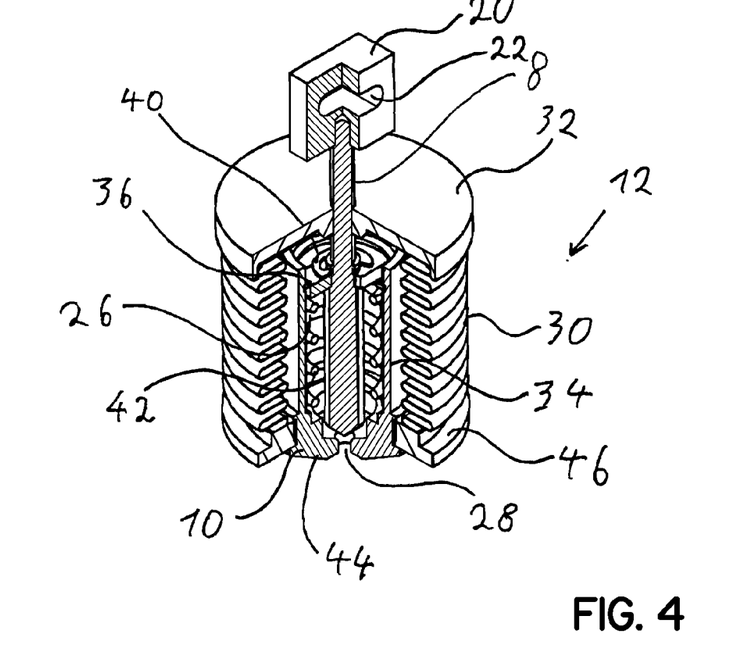
FIG. 4 shows a perspective cut-away view of a main valve body as shown in FIG. 3.

Of the regulating valve 1, FIGS. 3 and 4 only show the main valve body 12 together with the inserted pilot valve body 8. At its upper end in the Figure the pilot valve body 8 has a connecting element 20 with a connecting opening 22 for connection to a float. The connecting element 20 is here screwed on to the pilot valve body 8.

The pilot valve body projects through a through opening 24 into the chamber 26 into the proximity of a control opening 28. In the through opening 24, there is also a small annular gap between the pilot valve body 8 and the cover 32, which gap can be used as a pressure equalisation opening. That pressure equalisation opening however is to be considered to be small in relation to the control opening 28.

The control opening 28 is shown in an open position in FIGS. 3 and 4. The chamber 26 is substantially formed by a bellows 30, the cover 32 and the closing portion 10. Arranged at the closing portion 10 is a pilot guide 34 which projects into the chamber 26 and does not form the inner boundary thereof. An entrainment ring 36 is arranged within the pilot guide 34. The pilot valve body 8 bears against the entrainment ring 36 from below in the Figure, with an entrainment disk 38. The entrainment disk 38 is fixed to the pilot valve body 8 by a clamping ring 40. The entrainment ring 36 and the entrainment disk 38 are together an entrainment means. The pilot valve body 8 is thus disposed in its position of being completely opened in relation to the control opening 28 as the entrainment means prevents further opening. The chamber 26 is connected to the surroundings by way of the opened control opening 28. In that respect the term surroundings in ordinary use ultimately denotes the discharge line system which was identified by reference 18 in FIG. 2.

A spring 42 is arranged as an elastic coupling within the pilot guide 34 which is here substantially in the form of a cylindrical casing. The spring 42 bears at one end against the closing portion 10 at the side towards the chamber 26 and at the other end against the entrainment disk 38. The spring 42 thus represents an elastic coupling means between the pilot valve body 8 and the main valve body 12. In that arrangement the spring 42 exerts a force on the pilot valve body 8 from the closing portion 10 by way of the entrainment disk 38. That force is directed in the opening direction with respect to the control opening 28. The pilot valve body 8 and the control opening 28 are thus biased in the open position by the spring 42.

The pilot valve body 8 is mechanically coupled to the main valve body 12 on the one hand by entrainment means, namely the entrainment ring 36 and the entrainment disk 38, and on the other hand by way of an elastic coupling element, namely the spring 42.

The closing portion 10 is divided into an inner closing portion 44 and an outer closing portion 46. Those two closing portions 44 and 46 are fixedly connected together and are provided and illustrated as two components in particular for reasons relating to manufacturing engineering. In this case the bellows 30 is fixedly connected to the outer closing portion 46 and the cover 32. The element consisting of the cover 32, the bellows 30 and possibly also together with the outer closing portion 46 is also often referred to generally as the bellows.

To describe the mode of operation of the regulating valve according to the invention it is now described in detail with reference to some valve positions.

Figure 5:
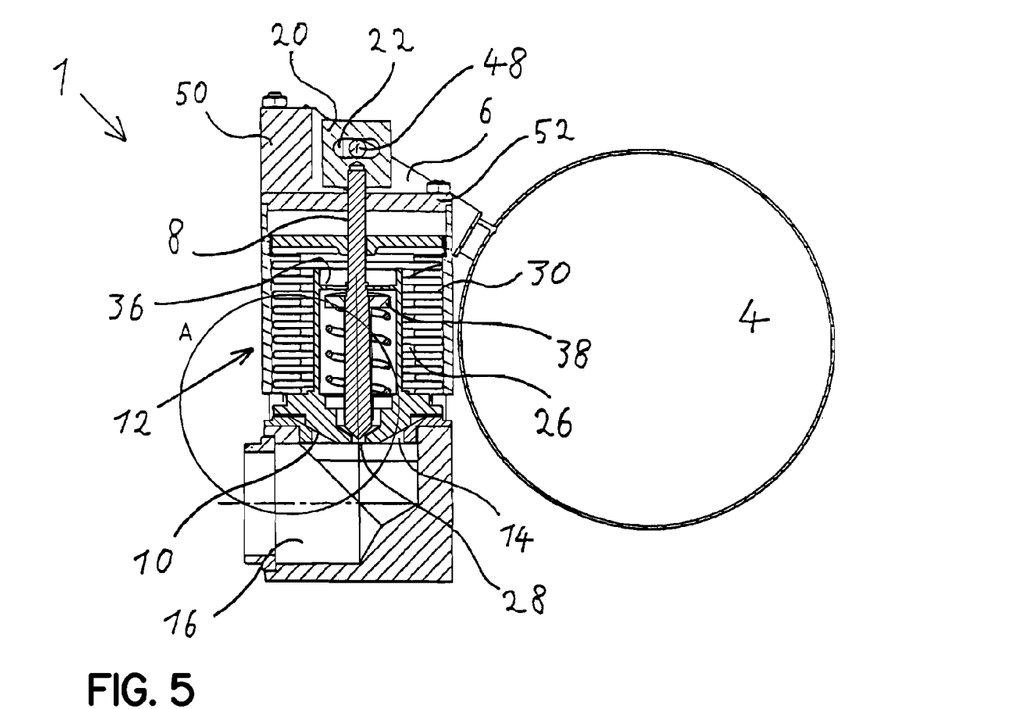
FIG. 5 shows a view in section of a regulating valve with float in a completely closed condition.

FIG. 5 shows the regulating valve 1 with a float 4 in the lowermost position. The regulating valve is arranged together with the float 4 in a container, as FIG. 2 shows. For the sake of improved clarity of the drawing however the container is not shown in the following Figures. In the FIG. 5 position the low position of the float 4 acts by way of the arm 6 and a transverse rod 48 mounted in the connecting opening 22 on the pilot valve body 8 by way of the connecting element 20. In that case the arm 6 of the float 4 is arranged pivotably at a mounting portion 50. The pilot valve body 8 is mounted and guided in a guide plate 52. Accordingly a pivotal movement of the float 8 on the arm 6 is converted into an axial movement of the pilot valve body 8. That axial movement is in a vertical direction as shown in FIG. 5. However such a vertical direction of movement is not necessary, but it is also possible to involve a horizontal or other axial movement if the regulating valve is correspondingly installed.

With the regulating valve 1 in that low position the control opening 28 is closed by the pilot valve body 8, namely its substantially conical portion formed in the region of the control opening 28. In that case the entrainment means formed from the entrainment ring 36 and the entrainment disk 38 is free. The outlet opening 14 is also closed by the closing portion 10.

The regulating valve 1 is thus in its completely closed rest condition and the pressure in the chamber 26 thus corresponds to the primary pressure in the container. Only the region in the connecting arrangement 16, that is to say below the outlet opening 14, is at a different pressure, namely external pressure which is generally approximately atmospheric pressure.

The pilot valve body 8, the main valve body 12 and also the outlet opening 14 are arranged substantially concentrically around the same axis. To provide a detailed illustration of the control opening 28 and the outlet opening 14 therefore a view on an enlarged scale of only one side of those openings is sufficient, as is shown in FIG. 6.

The enlargement shows contact of the edge 54 of the outlet opening 14 in the region of a closing circle 56. It is not primary pressure but external pressure that occurs within the closing circle 56 in the outlet opening 14 and thus in the connecting arrangement 16. The closing portion 10 is surrounded by the primary pressure except for the region of the outlet opening 14, more specifically also through the gap opening 58. A differential pressure between the primary pressure and the external pressure is operative on a face of the size of the outlet area which here is provided in the closing circle 56. The closing force arises here out of the product of that differential pressure between the primary pressure and the external pressure and the outlet area.

Figure 6:
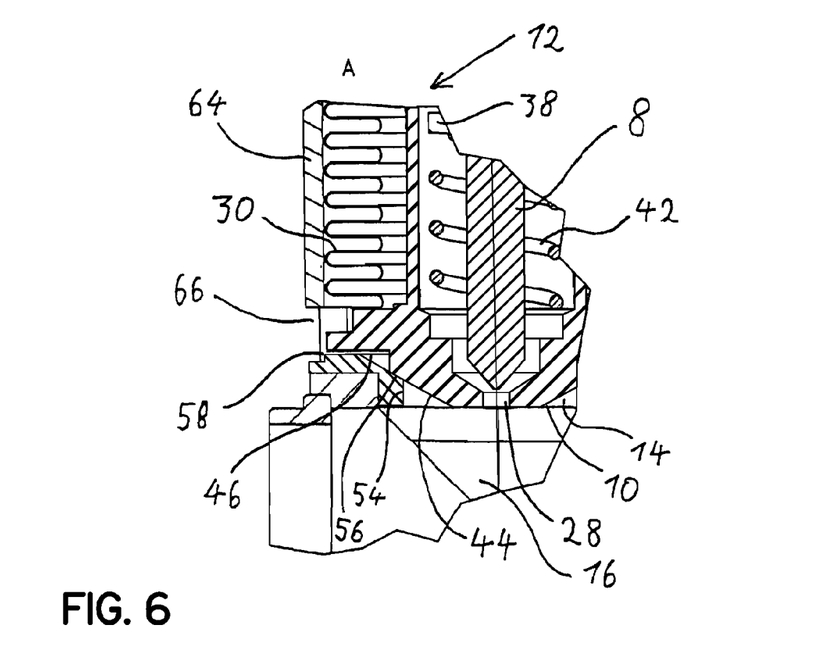
FIG. 6 shows the portion A shown in FIG. 5.
Figure 7:
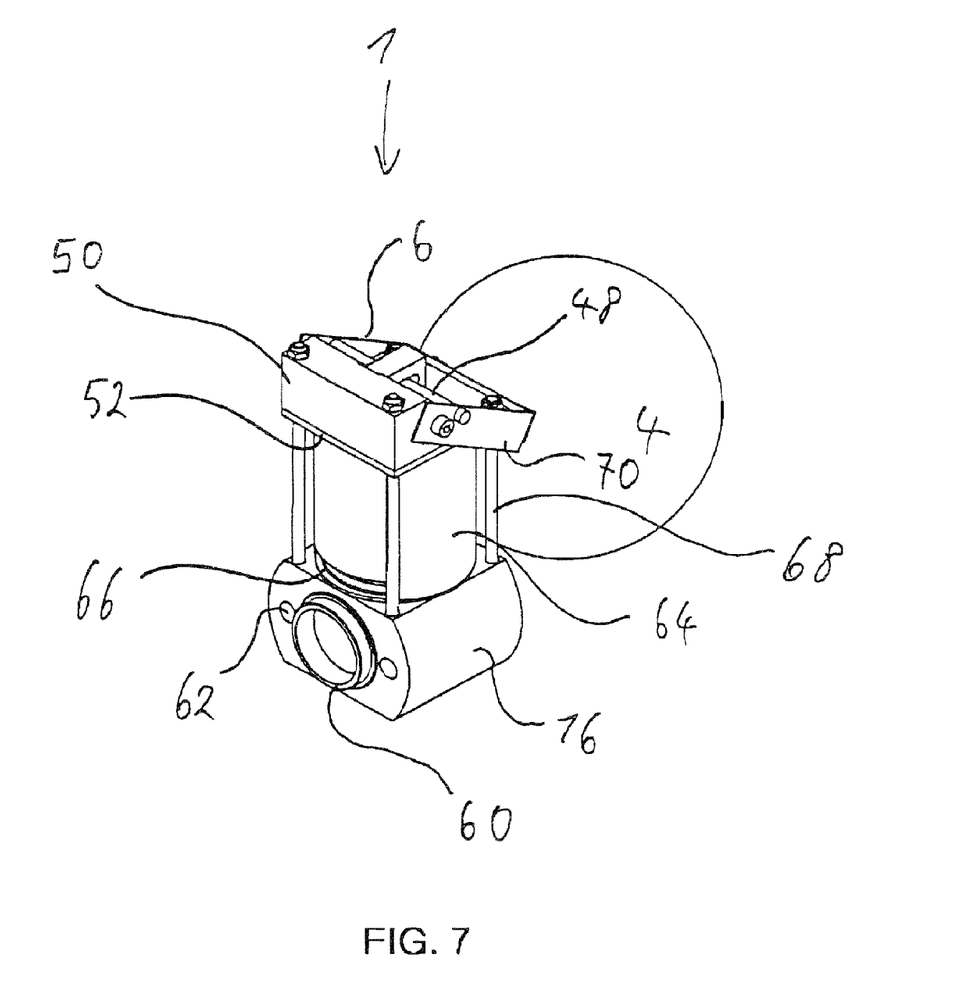
FIG. 7 shows a perspective view of the regulating valve with float as shown in FIG. 5.

The regulating valve in its position shown in FIGS. 5 and 6 is illustrated as a perspective view in FIG. 7. It can be seen therein that the regulating valve 1 has a connecting arrangement 16 with a connecting portion 60 to be connected to a further discharge line system. A connection can be made by means of the bores 62. A main guide 64 for the main valve body 12 is carried on the connecting arrangement 16. That main guide 64 has passages 66 through which on the one hand liquid can reach the outlet opening 14 and on the other hand a pressure connection exists between the main valve body and the interior of the container and thus the primary pressure.

Arranged on the main guide 64 is the guide plate 52 which in addition is held on the connecting arrangement 16 by holding rods 68. Arranged on the guide plate 52 is the mounting portion 50 in which the arm 6 is mounted. The arm 6 includes two struts 70 extending in parallel. Arranged between the struts 70 is a transverse rod 48 which projects through the connecting opening 22 in the connecting element 20 to transmit a force from the float 4 to the pilot valve body 8.

Figure 8:
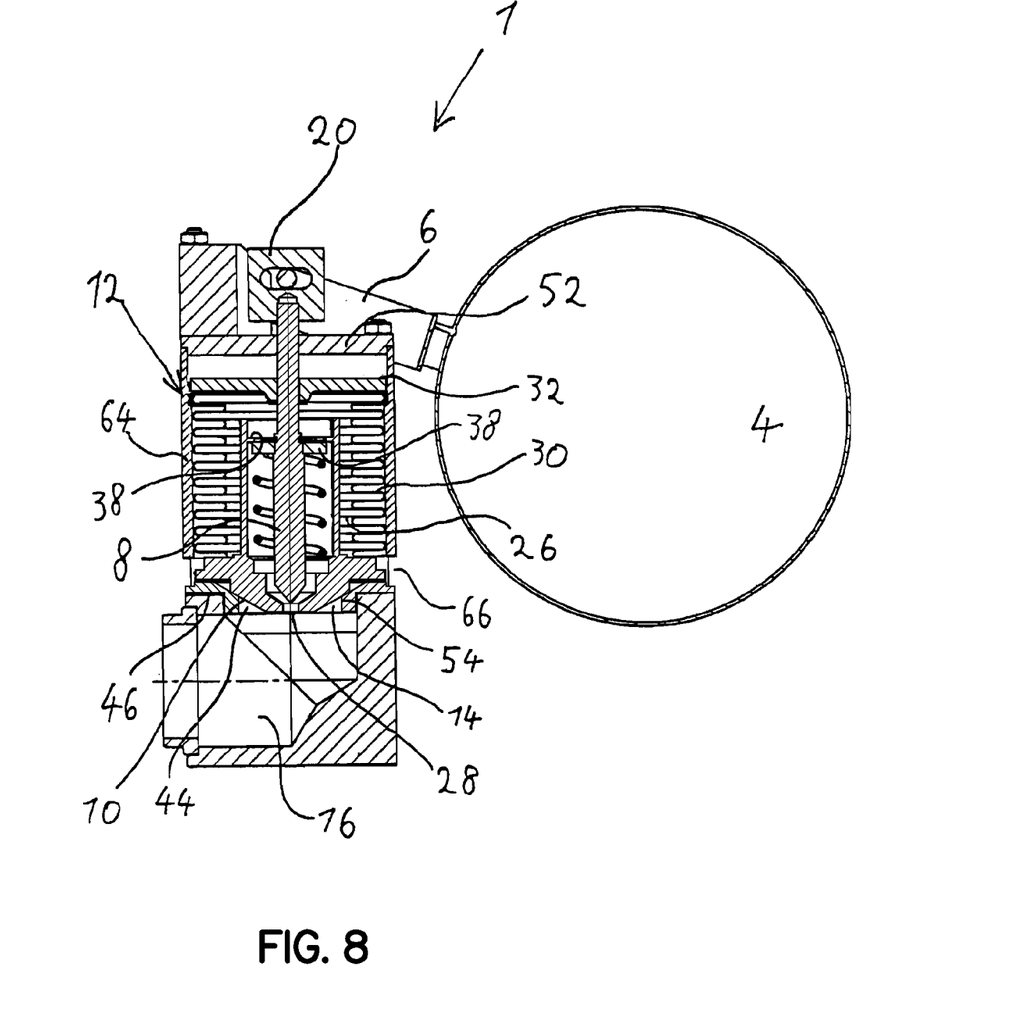
FIG. 8 shows a view in section of a regulating valve with float with the control opening opened but the outlet opening closed.

The float 4 is raised somewhat as shown in FIG. 8 in relation to the position shown in FIGS. 5 through 7. In that way the pilot valve body 8 is also raised by the mechanical coupling with the float 4. The pilot valve body 8 bears with its entrainment disk 38 against the entrainment ring 36. As the main valve body 12 is firstly held fixedly by the pressure conditions in its closed position in the outlet opening 14 the pilot valve body 8 can initially not move further, even if a buoyancy force also acts on the float 4. Such a buoyancy force however is usually slight in comparison with the pressure-induced closing force.

In the position of FIG. 8 the control opening 28 is opened by the pilot valve body 8 so that the pressure in the chamber falls. The opening of the control opening 28 is comparatively large in comparison with the annular gap formed in the through opening 24 between the pilot valve body 8 and the guide plate 52. That gap opening is so small that it cannot be seen in the Figure.

Figure 9:
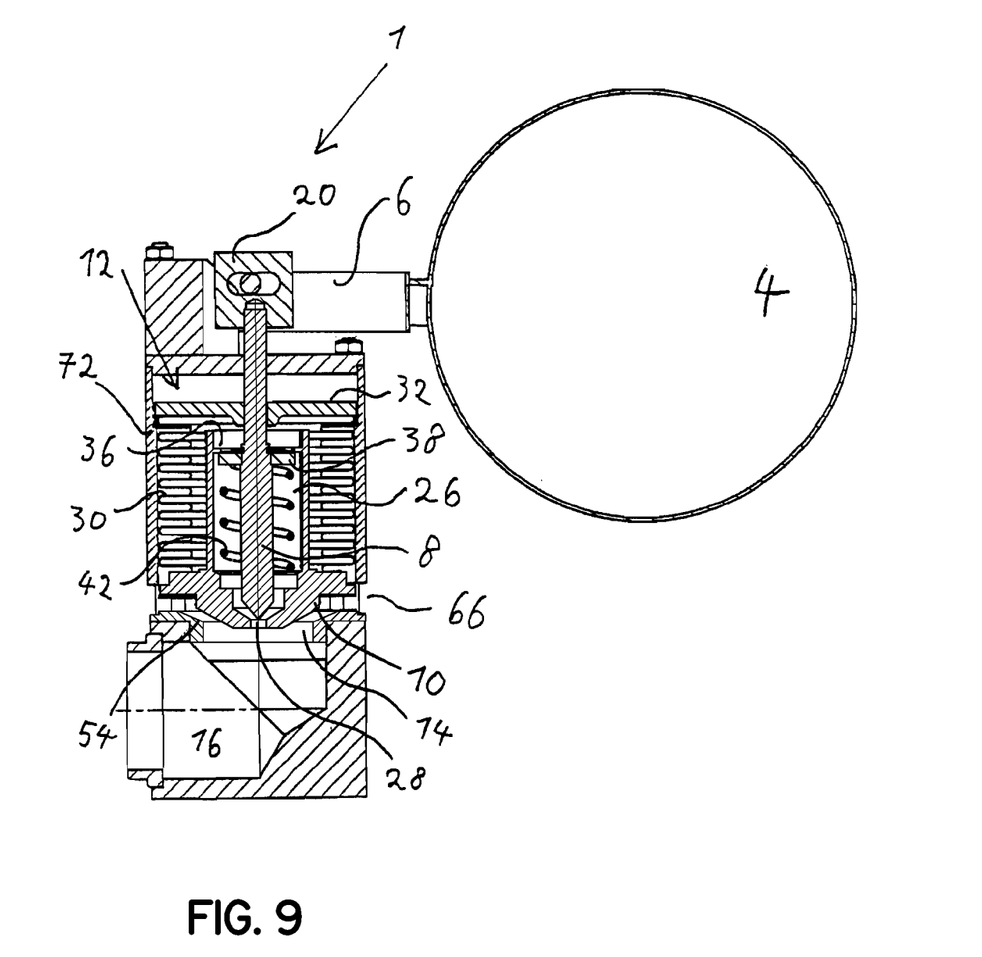
FIG. 9 shows a view in section of a regulating valve with float with the control and outlet openings open.

When the pilot valve opens the control opening a second differential is produced between the primary pressure and the chamber pressure and the first differential pressure between the chamber pressure and the external pressure changes. The first differential pressure multiplied by the outlet area produces the closing force. The second differential pressure multiplied by the opening area which here is in the form of an annular area around the closing circle produces the opening force. The greater the degree of opening of the control opening 28, the correspondingly more is the drop in the chamber pressure and the correspondingly greater does the opening force predominate. That first open condition of the outlet opening 14 is shown in FIG. 9. When the opening force predominates the closing portion 10 opens the outlet opening 14, the bellows 30 is contracted and the cover 32 bears against its seat 72. Therefore liquid can be discharged from the container through the passage 66 between the closing portion 10 and the opening edge 54 through the outlet opening 14 and further through the connecting arrangement 16.

Due to the opening movement of the closing portion 10 at the same time the entrainment ring 36 has moved in the opening direction and in so doing permits a further movement of the entrainment disk 38 and thus the pilot valve body 8. A further movement of the float 4 was correspondingly permitted. In the movement of the main valve body 12 which was performed hitherto the closing portion 10 moved and in so doing upset the bellows 30. The cover 32 has remained in its position.

Figure 10:
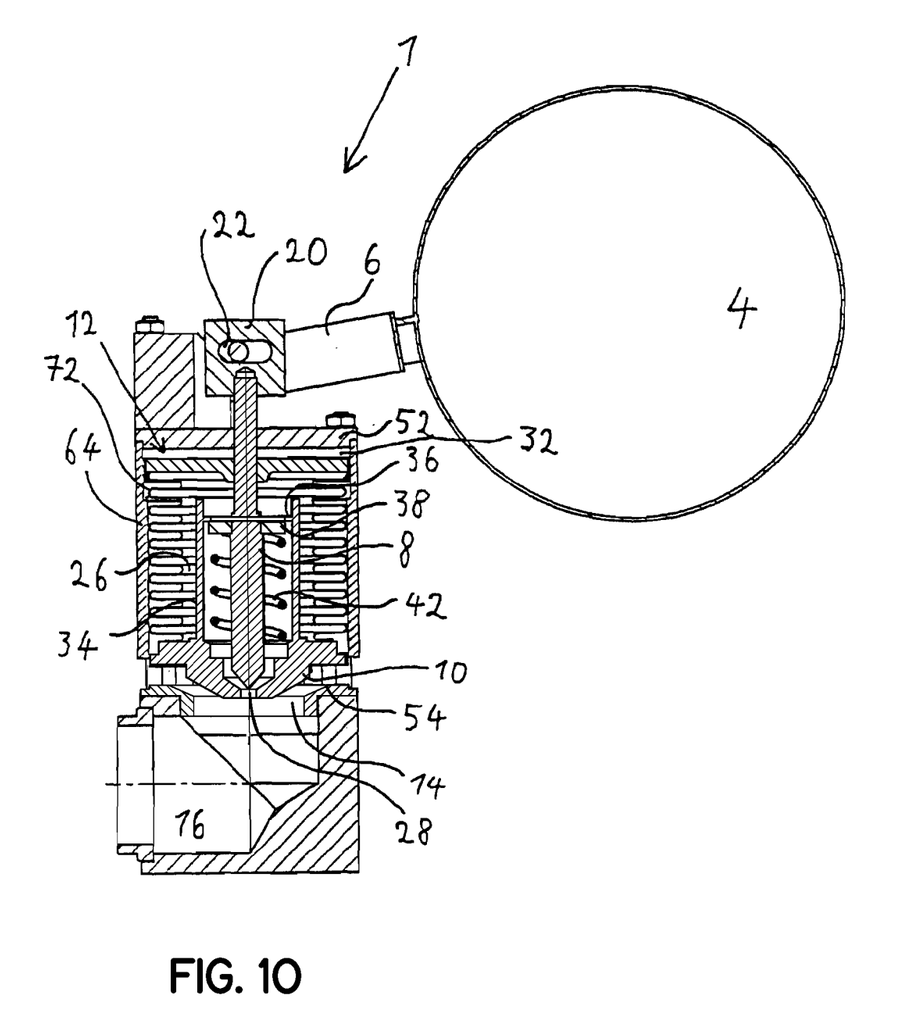
FIG. 10 shows a view in section of a regulating valve with float with the bellows cover partially lifted.

When the outlet opening 14 is wide open and there is an equally large flow of medium, in particular a flow of liquid, through the outlet opening 14, the flow out of the chamber 26 can be disturbed by the control opening 28 and the pressure in the chamber 26 can rise again. The second differential pressure decreases until the bellows 30 is relieved of stress by virtue of its spring stiffness. The cover 32 can then be pushed out of its seat 72, as is shown in FIG. 10. In that case not only is the cover 32 pushed out of its seat 72 but the outlet opening 14 is also still further opened in comparison with FIG. 9. That can be most clearly seen from the position, which is also higher, of the float 4.

When the outlet opening is greatly opened, in particular the force acting on the closing portion in the opening direction cannot be so clearly calculated as in the closed rest position. On the one hand, effects due to the liquid flowing through the outlet opening 14 are added to the static differential pressure while on the other hand a larger area than the opening face is operative for a differential pressure facing in the opening direction. Added to that is the fact that, in the wide open condition as shown in FIG. 10, there is also a high level of liquid and thus an increased buoyancy force acts by way of the float 4 on the pilot valve body 8 and thus on the main valve body 12 in the opening direction.

Figure 11:
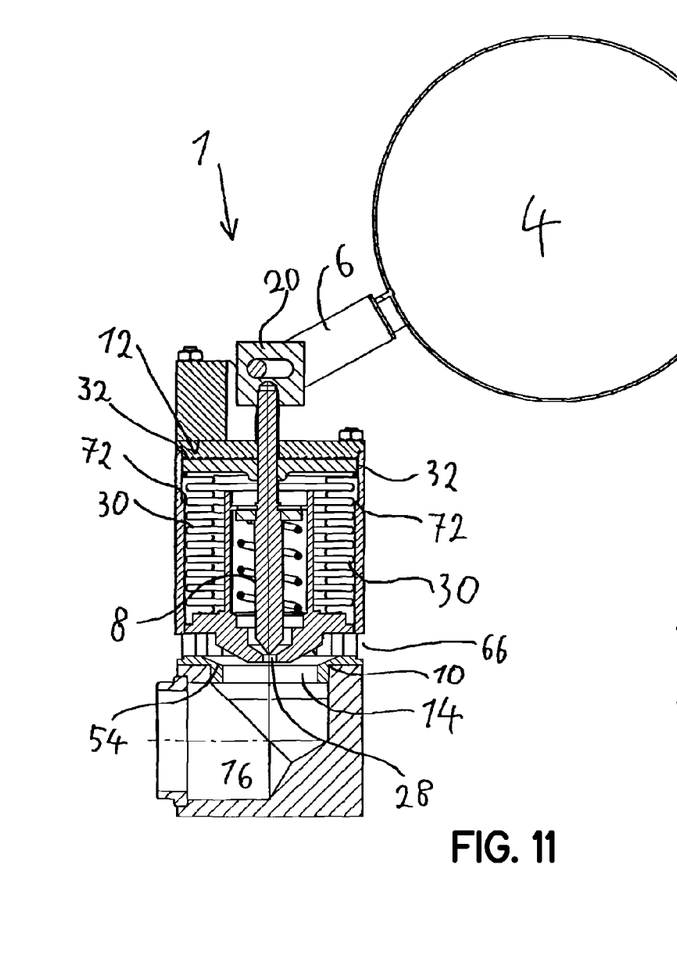
FIG. 11 shows a view in section of a regulating valve with float with the bellows cover completely lifted.
Figure 12:
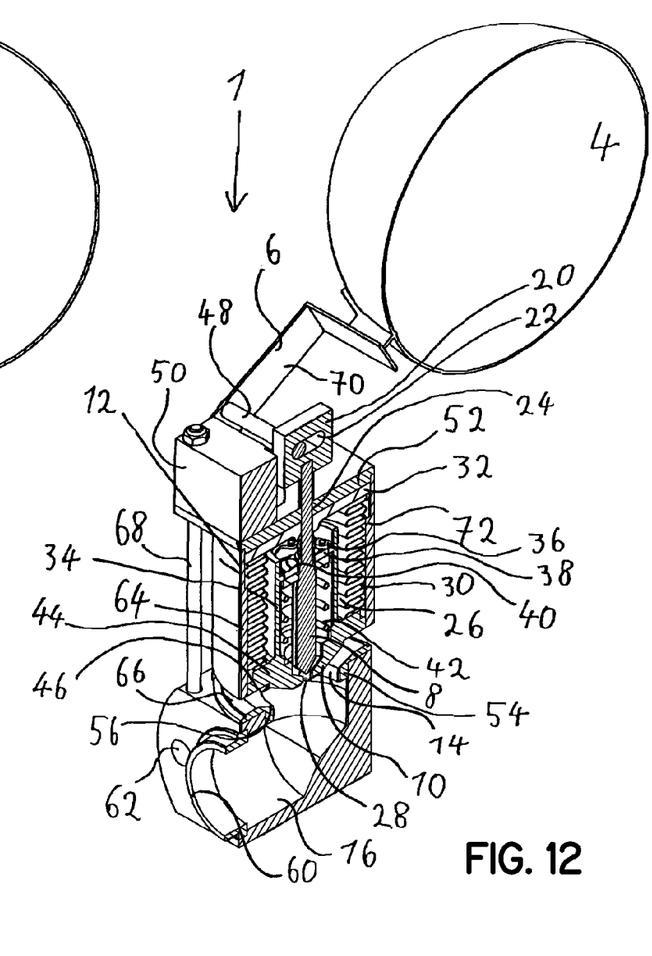
FIG. 12 shows a perspective view in section of a regulating valve as shown in FIG. 11.

At any event the pressure-induced forces leave scope to transmit a movement of the float 4 to the main valve body by way of a mechanical coupling. In this case the coupling is from the float 4 by way of the arm 6 to the pilot valve body 8 and from there further by way of the entrainment disk 38 to the entrainment ring 36 and thus to the pilot guide 34 and therewith to the main valve body 12. In that case the pressure-controlled movement of the main valve body is converted into a movement mechanically guided by the float 4. The main valve body comprising the bellows cover 32, the bellows 30 and the closing portion 10 is in this case, if the pressure-induced forces are no longer dominant, moved by mechanical coupling to the float 4, basically like a rigid piston. In that case the main valve body can move still further in the opening direction in relation to FIG. 10 until the cover 32 reaches the guide plate 52 as is shown in FIGS. 11 and 12. The fact that the cover 32 can be moved out of its seat 72 provides that, when the outlet opening 14 is wide open, the bellows 32 does not have to be excessively upset. Accordingly the bellows 30 on the one hand does not oppose the opening movement while on the other hand it is also not subjected to excessive upsetting. Accordingly, excessive fatigue phenomena and also a reduction in the operating life of the bellows are avoided.

A further positive side effect of that joint movement of the cover 32, the bellows 30 and the closing portion 10 is that, with very low levels of primary pressure in the container and thus low differential pressures, the outlet opening 14 can be opened and closed even exclusively or at least predominantly directly by the mechanical coupling between the float and the main valve body. The position of the main valve body then substantially depends on the position of the float 4.

A substantial advantage over the state of the art is also afforded with the present invention for high primary pressures upon closure of the outlet opening 14. A closing movement occurs when the level of liquid in the container drops and thus the float moves from its position of FIGS. 11 and 12 by way of the position of FIG. 10 to the position of FIG. 9. In that movement the cover 32, the bellows 30 and the closing portion 10 operate substantially together like a rigid body. In the position of FIG. 9 however the cover 32 has reached its seat 72 and cannot therefore be further moved in the closing direction.

Now the movement of the main valve body 12 depends substantially on the movement of the float 4. In other words in the downward movement of the float 4 firstly the movement is transmitted to the pilot valve body 8. The pilot valve body 8 is braced to the main valve body 12 by way of the entrainment means consisting of the entrainment ring 36 and the entrainment disk 38 on the one hand and by way of the spring 42 on the other hand. Thus, in a movement of the pilot valve piston 8 in the closing direction, a corresponding force is transmitted by way of the spring 42 to the closing means 10 and thus the main valve body 12 and the latter is moved in a direction towards the outlet opening 14. Accordingly the pilot valve body 8 does not initially approach the control opening 28 but moves together with same in a direction towards the outlet opening. The approximately balanced, pressure-induced forces therefore remain substantially maintained because of the opened control opening 28. At the same time the entrainment disk 38 and the entrainment ring 36 prevent the main valve body from moving into the outlet opening 14, without also moving the pilot valve body. Accordingly, depending on the respective position of the float 4, the main valve body 12 can be gradually moved in a direction towards the outlet opening 14 and therefore into the closed position. Fluctuations in pressure are damped by the mechanical coupling to the float 4. That gradual movement also implies that the main valve body 12 and therewith also the closing portion 10 can be held in an intermediate position between the completely closed and the wide-open outlet opening, depending on the respective level of liquid. That avoids a continuing change between open and closed with the regulating valve according to the invention.

When the float 4 also moves further downwardly from the position of FIG. 9 by virtue of a falling level of liquid, it can gradually reach the position shown in FIG. 8 in which the outlet opening 14 is closed and the control opening 28 is still open. In that case, a movement into that closed position, which is more gradual in comparison with conventional regulating valves, is basically possible.

If the float 4 in its position of FIG. 8 moves still further downwardly then the closing portion 10 cannot be moved any further as it is already in contact with the opening edge 54. Now, due to the downward movement of the float 4, the pilot valve piston 8 moves towards the control opening 28 and finally closes it. Now, pressure can build up in the chamber 26 through the annular gap in the through opening 24 between the pilot valve piston 8 and the guide plate 52. The force in the closing direction which arises due to the product of the first differential pressure with the chamber end face, depending on the respective primary pressure in the container, then markedly predominates over the force arising out of the product of the second differential pressure and the opening face and the outlet opening 14 is closed fast.

Accordingly the invention provides a regulating valve which on the one hand is pressure-controlled but which on the other hand is directly mechanically controlled in particular in transitional regions. That means that it is possible to achieve partially open and closed positions respectively for the main outlet opening 14. That can depend on the level of liquid acting on the float 4, in particular when there are large amounts of liquid to be discharged a continuous and in particular hard opening and closing of the regulating valve is avoided.

The invention claimed is:

1. A regulating valve for the discharge of liquid from a container comprising a movable main valve body for opening and closing an outlet opening for the liquid to be discharged, and a movable pilot valve body for controlling the main valve body,
   wherein the main valve body and the pilot valve body are mechanically coupled together at least in one position relative to each other, there is provided an entrainment means for transmitting a movement of the pilot valve body to the main valve body or vice-versa, and
   there is provided an elastic coupling means for coupling the main valve body to the pilot valve body, and wherein the entrainment means is adapted to transmit a force of the pilot valve body to the main valve body in the opening direction of the main valve body and/or the elastic coupling means is adapted to transmit a force of the pilot valve body to the main valve body in the closing direction of the main valve body.

2. A regulating valve as set forth in claim 1 wherein coupling is effected by way of a bodily contact.

3. A regulating valve as set forth in claim 1 wherein the pilot valve body is at least partially arranged within the main valve body.

4. A regulating valve as set forth in claim 1 wherein the pilot valve body and the main valve body are arranged coaxially relative to each other and/or at least one of the two valve bodies is movable along the longitudinal axis thereof.

5. A regulating valve as set forth in claim 1 wherein the main valve body is substantially of a sleeve form.

6. A container comprising a regulating valve of claim 1.

7. A regulating valve as set forth in claim 1 wherein the main valve body is coupled to a float mechanically, by way of a lever arrangement and/or by way of the pilot valve body.

8. A regulating valve as set forth in claim 7 wherein the float is so connected to the main valve body that any buoyancy force at the float acts on the main valve body in the opening direction of the main valve body.

9. A regulating valve as set forth in claim 1 wherein the main valve body has a chamber end face facing towards the chamber to convert a first differential pressure between a pressure in the chamber and an external pressure into a force in the closing direction of the main valve body and an opening face which is remote in relation to the chamber end face to convert a second differential pressure between the pressure in the container into a force in the opening direction of the main valve body.

10. A regulating valve as set forth in claim 9 wherein a force acting on the main valve body is substantially determined by a force difference between the product of the chamber end face and the first differential pressure and the product of the opening face and the second differential pressure.

11. A regulating valve as set forth in claim 1 wherein the main valve body at one end has a substantially conical or spherical narrowing for closing the outlet opening.

12. A regulating valve as set forth in claim 11 wherein the control opening is arranged in the conical or spherical narrowing.

13. A regulating valve as set forth in claim 1 wherein the main valve body has an abutment.

14. A regulating valve as set forth in claim 13 wherein the abutment is connected to an end of the bellows.

15. A regulating valve as set forth in claim 1, further comprising a bellows for surrounding a chamber in the main valve body, wherein the main valve body has a control opening closable by the pilot valve body.

16. A regulating valve as set forth in claim 15 wherein the bellows substantially surrounds the main valve body in the form of a cylindrical casing.

17. A regulating valve as set forth in claim 15 wherein the bellows forms a wall of the chamber for closing off the chamber relative to the container.

18. A regulating valve as set forth in claim 15 wherein the control opening closable by the pilot valve body is connected to the chamber so that the chamber can be opened by the pilot valve body to permit a reduction in pressure in the chamber.

19. A regulating valve as set forth in claim 15 wherein the pilot valve body has at an end a conical or spherical narrowing for closing the control opening.

20. A regulating valve as set forth in claim 15 wherein the bellows is connected at one side to a cover to close the chamber.

21. A regulating valve as set forth in claim 20 wherein the cover is arranged movably with respect to the outlet opening and/or the opening face.

22. A regulating valve as set forth in claim 17 wherein the pilot valve body projects into the chamber through a through opening arranged in the cover and the through opening permits axial movement of the pilot valve body.

23. A regulating valve as set forth in claim 22 wherein for at least steady-state pressure equalisation between the chamber and the container, there is provided an equalisation opening, and the equalisation opening is identical to the through opening.

* * * * *

UNITED STATES PATENT AND TRADEMARK OFFICE
CERTIFICATE OF CORRECTION

| | | |
|---|---|---|
| PATENT NO. | : 8,132,589 B2 | Page 1 of 1 |
| APPLICATION NO. | : 12/297909 | |
| DATED | : March 13, 2012 | |
| INVENTOR(S) | : Bernhard Kruhsel et al. | |

It is certified that error appears in the above-identified patent and that said Letters Patent is hereby corrected as shown below:

Column 14

Line 22, in claim 22 change "17" to --15--.

Signed and Sealed this
First Day of May, 2012

David J. Kappos
*Director of the United States Patent and Trademark Office*